United States Patent [19]

Rao et al.

[11] 4,057,676

[45] Nov. 8, 1977

[54] CELL CONTAINING CARBON-FLUORINE COMPOUND CATHODE, ALKALI METAL ANODE AND SOLID HALO-ALUMINUM ALKALI METAL COMPOUND ELECTROLYTE

[75] Inventors: Bhaskara M. L. Rao, Fanwood; Paul A. Malachesky, Berkeley Heights, both of N.J.

[73] Assignee: Exxon Research & Engineering Co., Linden, N.J.

[21] Appl. No.: 756,642

[22] Filed: Jan. 4, 1977

[51] Int. Cl.² ............................................ H01M 10/44
[52] U.S. Cl. ........................................ 429/50; 429/191; 429/199; 429/218
[58] Field of Search ................. 429/50, 191, 199, 218

[56] References Cited

U.S. PATENT DOCUMENTS

| | | | |
|---|---|---|---|
| 3,567,618 | 3/1971 | Foulletier et al. | 429/218 X |
| 3,751,298 | 8/1973 | Senderoff | 429/191 X |
| 3,922,174 | 11/1975 | Heller | 429/199 X |
| 3,990,915 | 11/1976 | Newman et al. | 429/218 X |

OTHER PUBLICATIONS

"Recent Results On Lithium Iron Conductors," Robert A. Huggins, Electrochamica Acta, vol. 22, pp. 773-781, July 1977.

*Primary Examiner*—C. F. LeFevour
*Attorney, Agent, or Firm*—Kenneth P. Glynn

[57] ABSTRACT

A novel electrochemical cell is disclosed utilizing an alkali metal anode, a fluorinated carbon cathode and a solid electrolyte consisting essentially of one or more alkali metal aluminum tetrahalide compounds of the formula $MAlX_4$ wherein M is an alkali metal and X is one or more halogens selected from the group consisting of chlorine and bromine. Preferred is the cell wherein the anode is lithium, the cathode is $C_2F$, and the electrolyte consists essentially of $LiAlCl_4$.

13 Claims, No Drawings

CELL CONTAINING CARBON-FLUORINE COMPOUND CATHODE, ALKALI METAL ANODE AND SOLID HALO-ALUMINUM ALKALI METAL COMPOUND ELECTROLYTE

BACKGROUND OF THE INVENTION

1. Field of the Invention

This invention relates to a novel electric current producing cell. More particularly, this invention relates to improvements in the electric current producing primary cells of the type comprising an alkali metal anode, a solid electrolyte, and a cathode of a fluorinated carbon material.

2. Description of the Prior Art

There has been considerable interest in recent years in developing high energy density batteries or voltaic cells. Among the systems being investigated are those employing nonaqueous liquid electrolytes, lightweight metals, such as alkali metals, as anodes, and compounds of carbon, particularly fluorine compounds of carbon as cathode-active materials. In this regard, mention is made of U.S. Pat. No. 3,536,532 and U.S. Pat. No. 3,514,337.

Additionally, various efforts have been made to develop solid state electrolytes for primary cell systems. Alkali metal-aluminum-chlorine and alkali metal-aluminum-bromine compounds have been utilized in liquid and molten state electrolyte systems (e.g., as described in U.S. Pat. No. 3,877,984 and U.S. Pat. No. 3,751,298), and solid alkali metal-aluminum-halogen compound conductivity studies have been made (e.g., N.I. Anufrieva et al, *Tseut. Metal.*, Vol. 1, pp 32–36 (1973); W. Weppner et al, *Physics Letters*, Vol. 58A, No. 4, pp 245–248 (1976); and, J. Schoonman et al, *J. Solid Chem.*, Vol. 16, pp 413–422 (1976)). However, to data, there has been no suggestion that alkali metal-aluminum-chlorine and alkali metal-aluminum-bromine compounds might be useful in solid state electrolyte systems of the type claimed in the present invention.

SUMMARY OF THE INVENTION

A novel electric current-producing cell of the present invention has been developed which comprises: (a) a cathode comprised of fluorinated carbon; (b) an alkali metal anode; and (c) a solid electrolyte consisting essentially of one or more alkali metal aluminum tetrahalide compounds of the formula:

$$MAlX_4 \qquad (1)$$

wherein M is an alkali metal and X is one or more halogens selected from the group consisting of chlorine and bromine.

DETAILED DESCRIPTION OF THE INVENTION

The novel electric current-producing cell of the present invention is a solid state cell which contains an anode, a cathode and a solid electrolyte. By "solid state" cell is meant a cell from which electric current may be drawn at temperatures below the melting point of the electrolyte.

In the cell of the present invention, an anode is employed which contains an anode-active material selected from the alkali metals. Desirably the anode is substantially sodium, potassium, lithium or alloys containing these, and preferably the anode is lithium metal, or a lithium metal alloy. The alkali metal, for example lithium, may be in contact with other metal structures such as nickel or silver screen which serve as current collectors.

The cathode in the current-producing cell of the present invention is any of those containing as their cathode-active material a compound of carbon and fluorine. These include any of the well-known fluorinated carbon cathodes including those prepared from any of the conductive carbons and include the $(C_xF_y)_n$ types. Among these, the $C_2F$ cathode is desirable in the cell of the present invention. Advantageously, the $C_2F$ cathode may be one which is formed by reacting a crystalline form of carbon such as natural or pyrolytic graphite, with an interhalogen fluoride in the presence of hydrogen fluoride. These interhalogen fluorides include those selected from $ClF_3$, $ClF_5$, $BrF_3$, $BrF_5$, $ICl$ and $IF_5$, particularly $ClF_3$. However, the cathode-active material may be prepared by any known method such as treatment of carbon with fluorine gas at elevated temperatures or simply by suspending the carbon, such as graphite, in liquid hydrogen fluoride and thereafter adding an interhalogen compound for a time sufficient for it to react with the carbon compound.

The electrolyte employed in the novel cell of the present invention is a solid electrolyte and consists essentially of one or more compounds of the formula:

$$MAlX_4 \qquad (1)$$

wherein M is an alkali metal and X is one or more halogens selected from the group consisting of chlorine and bromine. Desirably, the alkali metal M is selected from sodium, lithium and potassium. Preferred is lithium. The halogen X is either chlorine or bromine or both, but is desirably one or the other. Preferred is chlorine. Among the specific solid compounds which are included are: $LiAlCl_4$; $LiAlBr_4$; $LiAlCl_3Br$; $NaAlCl_4$; $NaAlBr_4$ and the like. The most preferred compound is $LiAlCl_4$.

The electrolyte compound of Formula (1) may be prepared by reacting an alkali metal halide with an aluminum halide, for example, in solution with the hydrogen halide which corresponds to the alkali metal halide. The reaction may proceed at an acceptable rate at room temperature or may be enhanced by heating. Known techniques may be used to concentrate and/or separate the solid compound, as desired. The resulting compound, usually in fine powder form, may be formed into the desired shape by pressing, rolling, binding with polymeric compounds which do not detrimentally affect the electrolytic activity of the compound or may be fused or melted and cooled to form a glassy phase.

The solid state electrolyte is placed between the cathode and the anode in the cell of the present invention to achieve an advantageous primary cell. In one embodiment, the electrolyte is rolled into or pressed into a thin sheet of about 10 mils or less. In another embodimemt, the solid electrolyte may be melted and then cooled to form a glassy solid sheet. In any event, the electrolyte consisting essentially of one or more Formula (1) type compounds may be formed into known solid electrolyte configurations for use in the electrochemical cell.

The present invention is illustrated by the following examples, but the invention should not be construed as being limited thereto:

EXAMPLE 1

A solid state electrolyte was prepared by pressing 0.4 grams of $LiAlCl_4$ (melting point 290.3° F) to 2500 lbs. into a 0.5 inch diameter X 0.05 inch thick cylindrical pellet. A $C_2F$ cathode was prepared by mixing 0.2 grams of $C_2F$, 0.1 grams of graphite powder and 0.1 grams of $LiAlCl_4$ and pressing the mixture into a pellet alongside the electrolyte pellet. The opposite side of the electrolyte pellet was attached to a lithium anode.

This solid state cell was operated at about 255° to about 260° F and performance measurements were made as shown in Table I, below.

TABLE I

| Li/LiAlCl₄/C₂F Operated at 255°–260° E | | | |
|---|---|---|---|
| Open Circuit (Volts) | Load (kilo-ohms) | Load E.M.F. (Volts) | Cell Current (Amps) |
| 3.42 | 75 | 3.22 | $4 \times 10^{-5}$ |
| 3.42 | 5 | 3.02 | $4 \times 10^{-4}$ |

EXAMPLE 2

The solid state cell prepared in accordance with Example 1 was operated at about 285° F to about 290° F and tested. The results are shown in Table II, below.

TABLE II

| Li/LiAlCl₄/C₂F Operated at 285°–290° F | | | |
|---|---|---|---|
| Open Circuit (Volts) | Load (kilo-ohms) | Load E.M.F. (Volts) | Cell Current (Amps) |
| 3.67 | 75 | 3.39 | $4.3 \times 10^{-5}$ |
| 3.67 | 5 | 2.85 | $5.4 \times 10^{-4}$ |
| 3.67 | 1 | 1.73 | $1.8 \times 10^{-3}$ |
| 3.67 | 0.5 | 1.8 | $2.8 \times 10^{-3}$ |

EXAMPLE 3

A solid state electrolyte was prepared in accordance with the procedure of Example b 1 except that the electrolyte was $LiAlBr_4$ (melting point 386.5° F) instead of $LiAlCl_4$, and the cathode was prepared using a mixture of 0.1 grams of graphite powder, 0.5 grams of $C_2F$ and 0.1 grams of the electrolyte. Performance tests results are shown in Table III, below.

TABLE III

| Li/LiAlBr₄/C₂F Operated at 50 kilo-ohm Load | | | |
|---|---|---|---|
| Temperature (° F) | Load E.M.F. (Volts) | Open Circuit (Volts) | Cell Current (Amps) |
| 200 | 0.43 | 3.31 | $2 \times 10^{-5}$ |
| 210 | 0.48 | 3.32 | $2 \times 10^{-5}$ |
| 220 | 0.58 | 3.33 | $2 \times 10^{-5}$ |
| 230 | 0.66 | 3.33 | $2 \times 10^{-5}$ |
| 240 | 0.80 | 3.30 | $2 \times 10^{-5}$ |
| 250 | 0.98 | 3.29 | $3 \times 10^{-5}$ |
| 260 | 1.05 | 3.26 | $3 \times 10^{-5}$ |
| 270 | 1.17 | 3.16 | $3 \times 10^{-5}$ |
| 280 | 1.22 | 3.15 | $4 \times 10^{-5}$ |
| 290 | 1.27 | 3.11 | $4 \times 10^{-5}$ |
| 300* | 1.20 | 3.08 | $3 \times 10^{-5}$ |
| 310 | 1.16 | 3.03 | $3 \times 10^{-5}$ |
| 320 | 1.12 | 2.99 | $3 \times 10^{-5}$ |

*Gas bubbling occurred at 300° F and higher at the electrolyte-electrode interface.

What is claimed is:

1. A current producing primary cell from which a current can be drawn at a temperature below the melting point of the electrolyte, comprising:
   a. a cathode having a compound formed of fluorine and carbon;
   b. an alkali metal-containing anode; and
   c. a solid electrolyte consisting essentially of one or more compounds of the formula:

$MAlX_4$ wherein M is an alkali metal and X is one or more halogens selected from the group consisting of chlorine and bromine.

2. The cell of claim 1 wherein the anode is substantially sodium, lithium, potassium, or alloys containing these, and wherein M is selected from the group consisting of sodium, lithium and potassium.

3. The cell of claim 2 wherein X is a halogen selected from the group consisting of chlorine and bromine.

4. The cell of claim 1 wherein the cathode is fluorinated crystalline carbon material.

5. The cell of claim 4 wherein the anode is substantially sodium, lithium, potassium or alloys containing these, and wherein M is selected from the group consisting of sodium, lithium and potassium.

6. The cell of claim 5 wherein X is chlorine.

7. the cell of claim 6 wherein the cathode is $CF_2$, wherein the anode is substantially lithium, or a lithium alloy, and wherein the electrolyte consists essentially of $LiAlCl_4$.

8. A primary electric cell from which a current can be drawn at a temperature below the melting point of the electrolyte, comprising:
   a. a cathode containing a cathode-active material formed by reacting graphite with chlorine trifluoride in the presence of HF;
   b. a lithium metal-containing anode; and
   c. a solid electrolyte consisting essentially of $LiAlCl_4$.

9. The cell of claim 8 wherein the solid electrolyte has been melted and cooled to form a glassy phase.

10. A method of operating a current-producing primary cell, comprising:
    drawing a current from said cell at a temperature below the melting point of the electrolyte of said cell wherein said cell comprises a cathode having a compound formed of fluorine and carbon, an alkali metal-containing anode, and a solid electrolyte consisting essentially of one or more compounds of the formula:

$MAlX_4$ wherein M is an alkali metal and X is one or more halogens selected from the group consisting of chlorine and bromine.

11. The method of claim 10 wherein M is selected from the group consisting of sodium, lithium and potassium, and wherein X is a halogen selected from the group consisting of chlorine and bromine.

12. The method of claim 11 wherein the anode is substantially lithium or a lithium alloy, and wherein M is lithium.

13. The method of claim 12 wherein the solid electrolyte consists essentially of $LiAlCl_4$.

* * * * *